ated Mar. 30, 1971

United States Patent Office 3,573,028
Patented Mar. 30, 1971

3,573,028
METHOD FOR SUPPRESSING THE NITRIFICATION OF AMMONIUM NITROGEN IN SOIL
Kisaburo Ueno, Koza-gun, Akira Hirose, Yokohama, and Tetsuichi Shinozawa, Chigasaki, Japan, assignors to Mitsui Toatsu Chemicals Incorporated, Tokyo, Japan
No Drawing. Continuation-in-part of application Ser. No. 595,607, Nov. 21, 1966. This appplication May 2, 1968, Ser. No. 726,240
The portion of the term of the patent subsequent to Dec. 9, 1986, has been disclaimed
Int. Cl. A01n 9/14
U.S. Cl. 71—27
10 Claims

ABSTRACT OF THE DISCLOSURE

A method for suppressing the nitrification of ammonium nitrogen in soil comprising treating the soil in a plant growing area with a alkanoylsulfathiazole or sodium salt of sulfathiazole and a composition therefor.

---

This application is a continuation-in-part of prior and copending U.S. patent application Ser. No. 595,607, filed Nov. 21, 1966, now U.S. Pat. 3,482,957.

This invention relates to a method for suppressing the nitrification of ammonium nitrogen in soil and a composition therefor.

Since most plants obtain the greater part or all of nitrogen requirements from the soil, it is one of the most important agricultural problems to provide nutrient nitrogen in soil for the growth of plants. Nitrogen in soil is present in the three forms of organic nitrogen, ammonium nitrogen and nitrate nitrogen. Among them, ammonium nitrogen and nitrate nitrogen are well absorbed from soil and utilized by plants. In order to be available to the plants, the organic nitrogen must be converted to ammonium or ammonium salts by soil bacteria. This conversion occurs very quickly in the case of such organic reduced nitrogen fertilizer as urea, but very slowly in the case of other organic nitrogen compounds.

The ammonium nitrogen in soil is derived from bacterial conversion of organic nitrogen, or from applied reduced nitrogen fertilizers such as anhydrous ammonia, aqueous ammonia, ammonium sulfate, ammonium nitrate and ammonium phosphate. The ammonium nitrogen in soil is quickly oxidized to nitrate nitrogen by soil bacteria. (This process is known as nitrification.) The ammonium nitrogen is strongly adsorbed by soil which is a kind of cation exchanger and is not leached by rainfall or irrigation. However, the nitrate nitrogen which is an anion is not adsorbed by soil and is rapidly leached by rainfall or irrigations. Further, the nitrate nitrogen is reduced to nitrogen gas by soil bacteria. (The process is known as denitrification.) The nitrate nitrogen is so rapidly lost from soil as described above that rate of its utilization by plants is very low. Therefore, in order to prevent the loss of nitrogen from soil and to improve the rate of utilization of nitrogen by plants, it is necessary to suppress the nitrification of ammonium nitrogen by soil bacteria.

An object of the present invention is to provide an improved method of preventing the loss of soil nitrogen.

Another object of the present invention is to provide an improved method of suppressing the nitrification of ammonium nitrogen in soil.

A further object of the present invention is to provide a new composition to be employed in the method of the present invention.

The subject matter of the present invention is a method of suppressing the nitrification of ammonium nitrogen in soil comprising treating the soil in a plant growing area with a sulfathiazole derivative selected from the group consisting of alkanoylsulfathiazole

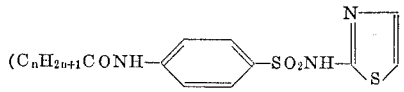

wherein $n$ is a positive integer, preferably, from 1 to 4) and sodium salt of sulfathiazole

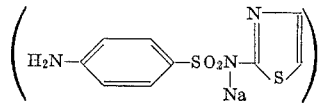

Examples of such alkanoylsulfathiazoles include acetylsulfathiazole, propionylsulfathiazole, butyrylsulfathiazole and valerylsulfathiazole.

By the method of the present invention, the conversion of ammonium nitrogen in soil to nitrate nitrogen is inhibited and ammonium nitrogen can be prevented from being rapidly lost from soil. This inhibiting action lasts for a long time. The ammonium nitrogen in this case may be derived from applied fertilizer containing ammonium nitrogen, for example, ammonia or ammonium salts, or may be formed by conversion of an organic nitrogen constituent in soil or by the conversion of organic fertilizer applied to soil.

In treating soil with the aforementioned sulfathiazole derivative, it is preferable to impregnate soil below the soil surface in a plant growing area with this compound so that the concentration of the compound in the soil is about 1 to 100 parts by weight, specifically about 1 to 30 parts by weight per million parts by weight of the soil. It is preferable that the amount of application of the aforementioned sulfathiazole derivative is made at least 5 grams per 1 are of the plant growing area.

The aforementioned sulfathiazole derivative may be distributed on a plant growing area prior to, simultaneously with or subsequent to the application of a nitrogen fertilizer. Further, when the soil is treated with the aforementioned sulfathiazole derivative after the harvest of crops, ammonium nitrogen produced from organic substances in the soil can be preserved for the next growing season. And it is also possible to prevent in the green house the generation of the phytotoxic nitrogen dioxide gas from the soil in the plant growing area by treating the plant growing area with the aforementioned sulfathiazole derivative.

In treating a plant growing area with the aforementioned sulfathiazole derivative, this compound may be used as mixed with a soil treating adjuvant including water, petroleum distillates or other organic solvent, surface active agent, fine powdered inert solid and nitrogen fertilizer.

The concentration of the aforementioned sulfathiazole derivative in such composition is not crtiical but can be any amount below 95% of the composition. Talc, chalk, gypsum, vermiculite, bentonite or diatomaceous earth can be used for the inert solid carrier.

A composition comprising the aforementioned sulfathiazole derivative and a fertilizer is most desirable in working the method of the present invention. This composition is produced by dispersing the aforementioned sulfathiazole derivative in a reduced nitrogen fertilizer such as ammonia, ammonium salts or urea. Further, this composition may contain a phosphate and/or potassium sait. The reduced nitrogen fertilizer may be either solid or liquid.

It is preferable that the aforementioned sulfathiazole derivative in this fertilizer composition is at least 0.5% by weight based on the weight of nitrogen present as reduced nitrogen in the fertilizer. In dispersing the sulfathiazole derivative in a reduced nitrogen fertilizer, it may be mechanically mixed with the fertilizer, or may be sprayed on the surfaces of the fertilizer in the form of organic solvent solution such as acetone or ethanol solution, or may be melted with a fertilizer of a comparatively low melting point such as urea to mix the aforementioned sulfathiazole derivative with the fertilizer.

In working the method of the present invention, soil can be treated with the aforementioned sulfathiazole derivative or the compositions containing the same by any convenient methods. For example, the aforementioned sulfathiazole derivative or the compositions containing the same may be mechanically mixed with the soil or may be distributed on the surface of the soil; applied to the surface of soil and thereafter dragged or disced into the soil to a desired depth; transported into the soil with a liquid carrier by injection, spraying or irrigations. Further, the fertilizer compositions including the aforementioned sulfathiazole derivative can be applied in the same manner as of applying a conventional fertilizer.

The following examples explain the present invention but are not construed as limiting. The parts therein are by weight.

EXAMPLE 1

There were prepared a mixture (I) obtained by adding 0.05 part of acetylsulfathiazole to 33 parts of urea and uniformly mixing them, a mixture (II) obtained by adding 0.5 part of acetylsulfathiazole to 33 parts of urea and uniformly mixing them and a mixture (III) obtained by adding 5 parts of acetylsulfathiazole to 33 parts of urea and uniformly mixing them. 50 g. of soil were uniformly mixed with each of 33 mg. of the mixture (I), 33.5 mg. of the mixture (II) and 38 mg. of the mixture (III). Each of the resulting mixtures contained 15 mg. of nitrogen per 50 g. of the soil. The concentration of acetylsulfathiazole in the soil was 1 p.p.m., 10 p.p.m. and 100 p.p.m. respectively. Each of said mixtures was put into a conical flask of a capacity of 100 cc. Water was added thereto so that the water content in the soil was 60% of the maximum water capacity. The flask was plugged with cotton. The contents were incubated at 28° C. for 20 days. After the completion of the incubation, the nitrogen in the soil was analyzed in respective forms. Thus the results in Table 1 were obtained.

The same experiments as described above were carried out on propionylsulfathiazole, butyrylsulfathiazole, valerylsulfathiazole and sodium salt of sulfathiazole and also, for comparison, on sodium pentachlorophenate known as a nitrification suppressing agent. The data are mean values of the duplication.

Further, for comparison, there are shown the analysis values of nitrogen in the respective forms in case soil alone and 50 g. of soil with the addition of 33 mg. of urea were incubated in the same manner as in the above described experiment.

TABLE 1

| Compounds | Forms of nitrogen | N in mg./50 g. of soil — Concentration of the compounds in soil | | |
|---|---|---|---|---|
| | | 1 p.p.m. | 10 p.p.m. | 100 p.p.m. |
| Acetylsulfathiazole | $NH_3$-N | 5.9 | 12.2 | 13.9 |
| | $NO_3$-N | 10.0 | 3.2 | 1.1 |
| Propionylsulfathiazole | $NH_3$-N | 2.6 | 8.7 | 10.6 |
| | $NO_3$-N | 12.6 | 7.0 | 5.1 |
| Butyrylsulfathiazole | $NH_3$-N | 1.3 | 6.5 | 11.1 |
| | $NO_3$-N | 14.4 | 8.9 | 4.4 |
| Valerylsulfathiazole | $NH_3$-N | 0.8 | 7.0 | 9.0 |
| | $NO_3$-N | 15.0 | 8.8 | 6.2 |
| Sodium salt of sulfathiazole* | $NH_3$-N | 6.3 | 12.5 | 14.2 |
| | $NO_3$-N | 9.1 | 3.1 | 1.1 |
| Pentachlorophenate | $NH_3$-N | 0.8 | 4.7 | 7.7 |
| | $NO_3$-N | 14.9 | 11.2 | 8.0 |
| Urea alone | $NH_3$-N | 0.5 | | |
| | $NO_3$-N | 15.0 | | |
| Soil alone | $NH_3$-N | 0.1 | | |
| | $NO_3$-N | 0.9 | | |

*1½ hydrate.

From the data of Table 1 it is evident that the alkanoylsulfathiazole and sodium salt of sulfathiazole are excellent in the nitrification suppressing activity.

EXAMPLE 2

A dust composition was prepared by mixing 5 parts of propionylsulfathiazole and 95 parts of talc and then grinding the resulting mixture. 6 kg. of this dust composition were distributed on the soil surface of 10 acres of a plant growing area and plowed into the soil. Then 20 kg. of urea were applied.

EXAMPLE 3

A fertilizer composition was prepared by spraying 0.75 part of acetylsulfathiazole dissolved in ethanol onto a granular compound fertilizer containing 18% of N, 18% of $P_2O_5$ and 18% of $K_2O$ while being rolled in a rotary cylinder and then drying the resulting mixture. 20 kg. of this fertilizer composition were applied to 10 acres of a plant growing area.

EXAMPLE 4

A liquid composition was prepared by mixing 0.5 part of sodium salt of sulfathiazole with 100 parts of aqueous urea solution containing 50 parts of urea. 30 kg. of this liquid composition were distributed on the soil surface of 10 acres of a plant growing area.

EXAMPLE 5

A wettable powder was prepared by mixing 65 parts of butyrylsulfathiazole, 30 parts of clay and 5 parts of sodium dodecylbenzenesulfonate as dispersing agent and then grinding the resulting mixture. 350 gr. of this wettable powder were dispersed in 100 l. of water and sprayed on the soil surface of 10 acres of a plant growing area. Then 15 kg. of urea were applied.

EXAMPLE 6

An emulsifiable concentrate was prepared by mixing 20 parts of valerylsulfathiazole, 70 parts of xylene and 10 parts of Emanone 1112 (trade name) as emulsifying agent. 1 kg. of this emulsifiable concentrate was mixed with 100 l. of water and sprayed on the soil surface of 10 acres of a plant growing area a half day after the application of 15 kg. of urea.

In this invention, the expression "reduced nitrogen fertilizers" means fertilizers containing nitrogen in the reduced state including ammonia, ammonium salts and organic compounds readily convertible in the soil to ammonia or ammonium salts such as urea and cyanamide.

What is claimed is:

1. A method for suppressing the nitrification of ammonium nitrogen in soil and preventing rapid loss of ammonium nitrogen therefrom comprising treating the soil in a plant growing area with a sulfathiazole derivative selected from the group consisting of alkanoylsulfathiazoles and sodium salt of sulfathiazole.

2. A method for suppressing for the nitrification of ammonium nitrogen in soil and preventing rapid loss of ammonium nitrogen therefrom comprising impregnating the soil below the soil surface in a plant growing area in concentration sufficient to suppress the nitrification with a sulfathiazole derivative selected from the group consisting of alkanoylsulfathiazoles and sodium salt of sulfathiazole, said concentration being from about 1 to 100 parts by weight per million parts by weight of soil.

3. A method as claimed in claim 2 wherein said alkanoylsulfathiazoles have 2 to 5 carbon atoms in their alkanoyl moiety.

4. A method for suppressing for the nitrification of ammonium nitrogen in soil and preventing rapid loss of ammonium nitrogen therefrom comprising impregnating the soil below the soil surface in a plant growing area in concentration sufficient to suppress the nitrification with a composition comprising a sulfathiazole derivative in mixture with a soil treating adjuvant, said sulfathiazole being selected from the group consisting of alkanoylsulfathiazoles and sodium salt of sulfathiazole, said concentration being from about 1 to 100 parts by weight per million parts by weight of soil.

5. A method as claimed in claim 4 wherein said alkanoylsulfathiazoles have 2 to 5 carbon atoms in their alkanoyl moiety.

6. A method as claimed in claim 4 wherein said adjuvant is a reduced nitrogen fertilizer selected from the group consisting of ammonia, ammonium salts and urea.

7. A composition for suppressing the nitrification of ammonium nitrogen present in soil comprising a sulfathiazole derivative selected from the group consisting of of alkanoylsulfathiazoles and sodium salt of sulfathiazole. and a source of reduced nitrogen.

8. A fertilizer composition comprising a reduced nitrogen fertilizer as source of ammonium nitrogen and a sulfathiazole derivative selected from the group consisting of alkanoylsulfathiazole and sodium salt of sulfathiazole.

9. A fertilizer composition comprising a reduced nitrogen fertilizer selected from the group consisting of ammonia, ammonium salts and urea and a sulfathiazole derivative selected from the group consisting of alkanoylsulfathiazoles and sodium salt of sulfathiazole, said sulfathiazoles being present in a concentration of at least 0.5 percent by weight based on the weight of the reduced nitrogen in the reduced nitrogen fertilizer.

10. A fertilizer composition as claimed in claim 9 wherein said sulfathiazoles have 2 to 5 carbon atoms in their alkanoyl moiety.

References Cited
UNITED STATES PATENTS 3,482,957   12/1969   Ueno et al. _____ 71—1

REUBEN FRIEDMAN, Primary Examiner

R. BARNES, Assistant Examiner

U.S. Cl. X.R.

71—1, 103